United States Patent
Ahmad et al.

(10) Patent No.: US 12,233,897 B2
(45) Date of Patent: Feb. 25, 2025

(54) ADAPTIVE VEHICLE DRIVING ASSISTANCE SYSTEM

(71) Applicant: Ford Global Technologies, LLC, Dearborn, MI (US)

(72) Inventors: Syed Amaar Ahmad, Canton, MI (US); Azin Neishaboori, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 279 days.

(21) Appl. No.: 18/046,215

(22) Filed: Oct. 13, 2022

(65) Prior Publication Data

US 2024/0124010 A1    Apr. 18, 2024

(51) Int. Cl.
*B60W 50/14* (2020.01)
*B60W 40/08* (2012.01)
(Continued)

(52) U.S. Cl.
CPC .......... *B60W 50/14* (2013.01); *B60W 40/08* (2013.01); *G01C 21/3626* (2013.01);
(Continued)

(58) Field of Classification Search
CPC ............... B60W 50/14; B60W 40/08; B60W 2050/0075; B60W 2050/146; B60W 2556/10; B60W 2556/50; B60W 40/00; B60W 30/16; B60W 40/06; B60W 50/00; B60W 2050/0001; B60W 2050/143; G01C 21/3626; G01C 21/3461; G01C 21/34; G01C 21/343; G01S 19/14;
(Continued)

(56) References Cited

U.S. PATENT DOCUMENTS

| 10,157,422 | B2 | 12/2018 | Jordan Peters et al. |
| 10,340,327 | B2 | 7/2019 | Kato |

(Continued)

OTHER PUBLICATIONS

Ahura Jami, Analysis of Driver Behavior Modeling in Connected Vehicle Safety Systems through High Fidelity Simulation, University of Central Folorida Stars, 2018.

*Primary Examiner* — Donald J Wallace
*Assistant Examiner* — Jalal C Coduroglu
(74) *Attorney, Agent, or Firm* — Emily Drake; Eversheds Sutherland (US) LLP

(57) ABSTRACT

A vehicle driving assistance system is disclosed. The system may include a transceiver configured to receive a source location and a destination location for a user trip, a user driving information and road information associated with a plurality of geographical zones between the source location and the destination location. The system may further include a processor configured to calculate a user driving index based on the user driving information. Further, the processor may be configured to calculate a zone index for each geographical zone based on the road information. The processor may be further configured to correlate the user driving index and the zone index, and calculate a driver assistance index for each geographical zone based on the correlation. The processor may perform a control action when the calculated driver assistance index is greater than a predetermined threshold.

20 Claims, 7 Drawing Sheets

(51) Int. Cl.
*G01C 21/36* (2006.01)
*B60W 50/00* (2006.01)

(52) U.S. Cl.
CPC .............. *B60W 2050/0075* (2013.01); *B60W 2050/146* (2013.01); *B60W 2556/10* (2020.02); *B60W 2556/50* (2020.02)

(58) Field of Classification Search
CPC ....... G08G 1/096725; G08G 1/096805; G08G 1/096833
See application file for complete search history.

(56) References Cited

U.S. PATENT DOCUMENTS

| | | |
|---|---|---|
| 10,543,847 B2 | 1/2020 | Heath et al. |
| 11,113,970 B2 | 9/2021 | Agnew et al. |
| 2008/0040029 A1* | 2/2008 | Breed ................... G08G 1/161 |
| | | 701/514 |
| 2016/0246298 A1* | 8/2016 | Sato ...................... B60W 40/08 |
| 2017/0240185 A1* | 8/2017 | Li ............................ G08B 7/06 |
| 2018/0120118 A1* | 5/2018 | Huang ............... G01C 21/3608 |
| 2019/0285423 A1* | 9/2019 | Suzuki ............... G01C 21/3423 |
| 2019/0337522 A1* | 11/2019 | Hong ....................... G06N 7/01 |
| 2020/0090510 A1* | 3/2020 | Nagarajan ........ G08G 1/096716 |
| 2021/0280058 A1* | 9/2021 | Gupta ................... B60W 50/08 |
| 2021/0365701 A1* | 11/2021 | Eshet ................. G01C 21/3848 |
| 2022/0327922 A1* | 10/2022 | Shen ................... G08G 1/0141 |
| 2023/0065414 A1* | 3/2023 | Ariannezhad ...... G01C 21/3461 |

* cited by examiner

ADAPTIVE VEHICLE DRIVING ASSISTANCE SYSTEM

BACKGROUND

Modern vehicles provide multiple support functions to vehicle users. The support functions include navigation, driver assistance, vehicle-to-vehicle (V2V) communication, connected car/Internet of Things (IoT) functions and the like. Further, many modern vehicles support different levels (Levels 1 to 5) of driving automation, which enable the users to operate the vehicles in partially or fully autonomous mode.

While the vehicle support functions and driving automation may provide benefits to the users and support traditional driver control of vehicles, there are instances where advanced assistance to the users may be desired. For example, conventional driver assistance systems provide driving assistance to the users based on real-time traffic conditions, vehicle movement data and the like. However, the conventional systems may not provide customized driving assistance based on driver and/or road associated parameters.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
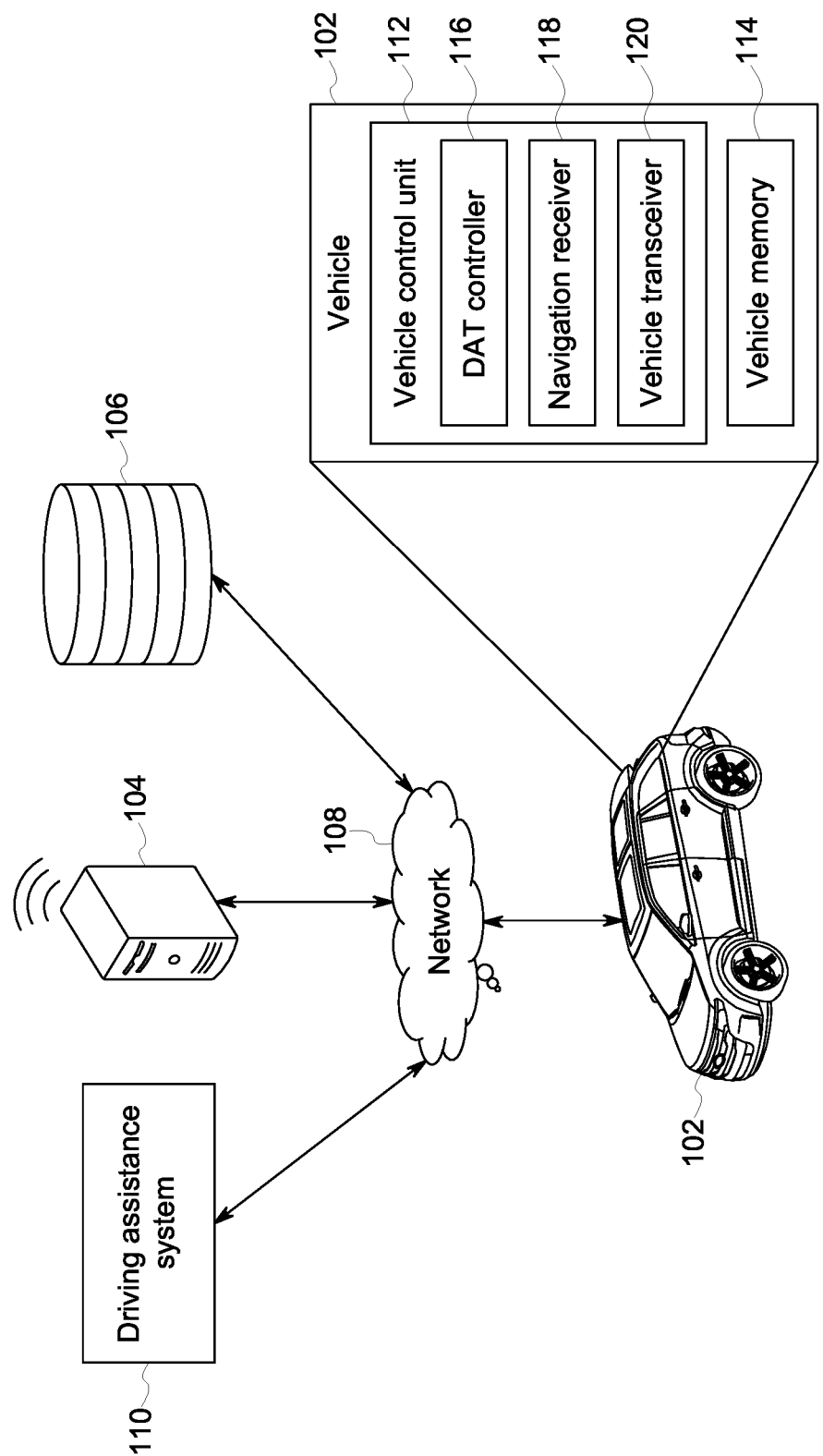
FIG. 1 depicts an example system in which techniques and structures for providing the systems and methods disclosed herein may be implemented.

The present disclosure describes a vehicle driving assistance system that may provide driving assistance to a user. The user may drive a vehicle that may be a manually operated vehicle or configured to operate in one or more partial autonomy modes (e.g., Level 1 to 4 autonomy mode). The system may provide customized driving assistance to the user based on user's driving behavior on a trip and road information of a road segment on which the user may drive the vehicle. In some aspects, the road segment may be divided/segregated into a plurality of geographical zones, and the user may travel through one or more geographical zones while driving the vehicle on the trip. The system may be configured to obtain a plurality of vehicle information, e.g., vehicle Global Navigation Satellite System (GNSS) location, speed, heading, etc., when the user drives the vehicle. Based on the vehicle information, the system may calculate a user driving index, which may indicate the user's driving behavior. In addition, the system may obtain road information associated with each geographical zone that may include a count of historical adverse instances that may have occurred in the geographical zone and an average count of vehicles driven over a time period. Based on the road information, the system may calculate a zone index for each geographical zone. The system may further correlate the user driving index and the zone index for each geographical zone, and calculate a driver assistance index for each geographical zone. The system may further perform a control action when a calculated driver assistance index for a geographical zone is greater than a predetermined threshold.

In some aspects, the control action may include generation of an alert notification for the user. For example, the system may generate the alert notification for the user when the user drives through or approaches a geographical zone with a driver assistance index greater than the predetermined threshold. In this case, the system may transmit the alert notification to a vehicle Human-Machine Interface (HMI) and/or a user device and indicate to the user that the user should drive cautiously in the geographical zone.

In other aspects, the control action may include automatic adjustment of one or more vehicle settings or parameters, specifically if the vehicle is configured to operate in partial autonomy modes. For example, the system may automatically adjust vehicle distance gap setting in adaptive cruise control or increase vehicle's displacement from pedestrian walkways when the user drives through or approaches the geographical zone with the driver assistance index greater than the predetermined threshold.

In further aspects, the control action may include recommendation of a route for the trip having geographical zones with corresponding driver assistance indexes less than the predetermined threshold. For example, the system may determine and recommend a route for the user's trip that may include geographical zones with driver assistance indexes less than the predetermined threshold. In some aspects, the system may display the recommended route on the vehicle HMI and/or the user device and may further provide navigation instructions to the user.

The present disclosure discloses a system that provides customized driving assistance to a user, based on user's driving behavior and road information of a road segment on which the user may drive a vehicle. Specifically, the system automatically adjusts vehicle settings/parameters when the vehicles passes through a geographical zone with a high driver assistance index, thus alleviating a need for human intervention. Further, the system provides driving assistance to the user based on dynamic road information that updates over time and does not rely on static road information/ statistics. Therefore, the system provides relevant and useful driving assistance to the user.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example system 100 in which techniques and structures for providing the systems and methods disclosed herein may be implemented. The system 100 may include a vehicle 102, a server 104 and a road information database 106, communicatively connected with each other via one or more networks 108 (or a network 108). The system 100 may further include a driving assistance system 110 that may communicatively couple with the vehicle 102, the server 104 and the road information database 106 via the network 108. In some aspects, the driving assistance system 110 may be located inside the vehicle 102 or the server 104.

In some aspects, the vehicle 102 may take the form of any passenger or commercial vehicle such as, for example, an off-road vehicle, a car, a crossover vehicle, a van, a minivan, a bus, a truck, etc. Further, the vehicle 102 may include any powertrain such as, for example, a gasoline engine, one or more electrically-actuated motor(s), a hybrid system, etc. Furthermore, the vehicle 102 may be a manually driven vehicle and/or be configured and/or programmed to operate in a fully autonomous (e.g., driverless) mode (e.g., Level-5 autonomy) or in one or more partial autonomy modes which may include driver assist technologies. Examples of partial autonomy (or driver assist) modes are widely understood in the art as autonomy Levels 1 through 4.

A vehicle having a Level-0 autonomous automation may not include autonomous driving features. A vehicle having Level-1 autonomy may include a single automated driver assistance feature, such as steering or gas pedal assistance. Adaptive cruise control is one such example of a Level-1 autonomous system that includes aspects of both gas pedal and steering.

Level-2 autonomy in vehicles may provide driver assist technologies such as partial automation of steering and gas pedal functionality, where the automated system(s) are supervised by a human driver that performs non-automated operations such as braking and other controls. In some aspects, with Level-2 autonomous features and greater, a primary user may control the vehicle while the user is inside the vehicle, or in some example embodiments, from a location remote from the vehicle but within a control zone extending up to several meters from the vehicle while it is in remote operation.

Level-3 autonomy in a vehicle can provide conditional automation and control of driving features. For example, Level-3 vehicle autonomy may include "environmental detection" capabilities, where the autonomous vehicle (AV) can make informed decisions independently from a present driver, such as speeding past a slow-moving vehicle, while the present driver remains ready to retake vehicle control if the system is unable to execute the task.

Level-4 AVs can operate independently from a human driver, but may still include human controls for override operation. Level-4 automation may also enable a self-driving mode to intervene responsive to a predefined conditional trigger, such as a road adverse condition. Level-5 AVs may include fully autonomous vehicle systems that require no human input for operation, and may not include human operational driving controls.

In some aspects, the vehicle 102 may include a Vehicle Control Unit (VCU) 112 and a vehicle memory 114 (that may be part of an on-board vehicle computer, not shown).

The VCU 112 may include a plurality of units including, but not limited to, a Driver Assistance Technologies (DAT) controller 116, a navigation receiver 118, a vehicle transceiver 120, a plurality of electronic control units (ECUs, not shown) and the like. In some aspects, the vehicle transceiver 120 may be outside the VCU 112. The VCU 112 may be configured and/or programmed to coordinate data within vehicle 102 units, connected servers (e.g., the server 104), other vehicles (not shown in FIG. 1) operating as part of a vehicle fleet and the driving assistance system 110.

In some aspects, the DAT controller 116 may provide Level-1 through Level-4 automated driving and driver assistance functionality to a vehicle user. The navigation receiver 118 may include one or more global positioning system (GPS) receivers, and/or other related satellite navigation systems such as the global navigation satellite system (GLNSS), Galileo, or other similar systems known in the art of autonomous vehicle operation. The navigation receiver 118 may be configured to obtain vehicle GPS/GNSS position. Further, the VCU 112 may be configured to determine vehicle telemetry information, e.g., vehicle speed, heading, etc.

The vehicle transceiver 120 may be configured to transmit vehicle data, e.g., the vehicle GPS/GNSS position, the vehicle telemetry information and/or the like, to the driving assistance system 110 and/or the server 104 via the network 108.

The vehicle memory 114 may store programs in code and/or store data for performing various vehicle operations in accordance with the present disclosure. The vehicle memory 114 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc. In some aspects, the vehicle memory 114 may store the vehicle GPS/GNSS position that may be determined by the navigation receiver 118 and the vehicle telemetry information that may be determined by the VCU 112.

A person ordinarily skilled in the art may appreciate that the vehicle architecture shown in FIG. 1 may omit certain vehicle units and/or vehicle computing modules. It should be readily understood that the environment depicted in FIG. 1 is an example of a possible implementation according to the present disclosure, and thus, it should not be considered limiting or exclusive.

The network 108 illustrates an example communication infrastructure in which the connected devices discussed in various embodiments of this disclosure may communicate. The network(s) 108 may be and/or include the Internet, a private network, public network or other configuration that operates using any one or more known communication protocols such as, for example, transmission control protocol/Internet protocol (TCP/IP), Bluetooth®, Bluetooth® Low Energy, Wi-Fi based on the Institute of Electrical and Electronics Engineers (IEEE) standard 802.11, UWB, and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

In some aspects, the server 104 may be part of a cloud-based computing infrastructure and may be associated with and/or include a Telematics Service Delivery Network (SDN) that provides digital data services to the vehicle 102 and other vehicles (not shown in FIG. 1) that may be part of a vehicle fleet.

Further, the road information database 106 may be an online database that stores road condition information (or road information) The road information may include information associated with road geometry for a plurality of road segments on which the vehicle user may drive the vehicle 102, historical adverse instances that may have occurred on the road segment(s) (e.g., historical vehicle adverse interactions that occurred on the road segment(s)), average count of vehicles driven on the road segment(s) and/or the like. In some aspects, the road geometry information may include information associated with a plurality of geographical zones included in the road segment(s). Specifically, the road segment(s) may be divided into a plurality of geographical zones, and the road information database 106 may L. In some aspects, the historical adverse instances may be vehicle accidents that may have occurred in each geographical zone. Further, the road information database 106 may be a database that stores traffic reports or accident information for each geographical zone that may be recorded by state or city government.

In addition, the road information database 106 may store an average count of vehicles driven through each geographical zone. The details of the plurality of geographical zones may be understood in conjunction with FIGS. 2 and 3. In some aspects, the road information database 106 may be configured to provide the road information to the driving assistance system 110 via the network 108.

As described above, the driving assistance system 110 may receive the road information from the road information database 106 and the vehicle GPS/GNSS position and telemetry information from the vehicle transceiver 120. In some aspects, the driving assistance system 110 may be configured to determine vehicle user's driving behavior (e.g., when the vehicle 102 is a manually operated vehicle or a Level 1 to 4 AV) based on the received vehicle GPS/GNSS position and telemetry information. Responsive to determining the vehicle user's driving behavior, the driving assistance system 110 may correlate the vehicle user's driving behavior with the road information received from the road information database 106, and provide customized driving assistance to the vehicle user. The process of providing customized driving assistance to the vehicle user may be understood in conjunction with FIG. 2.

Figure 2:
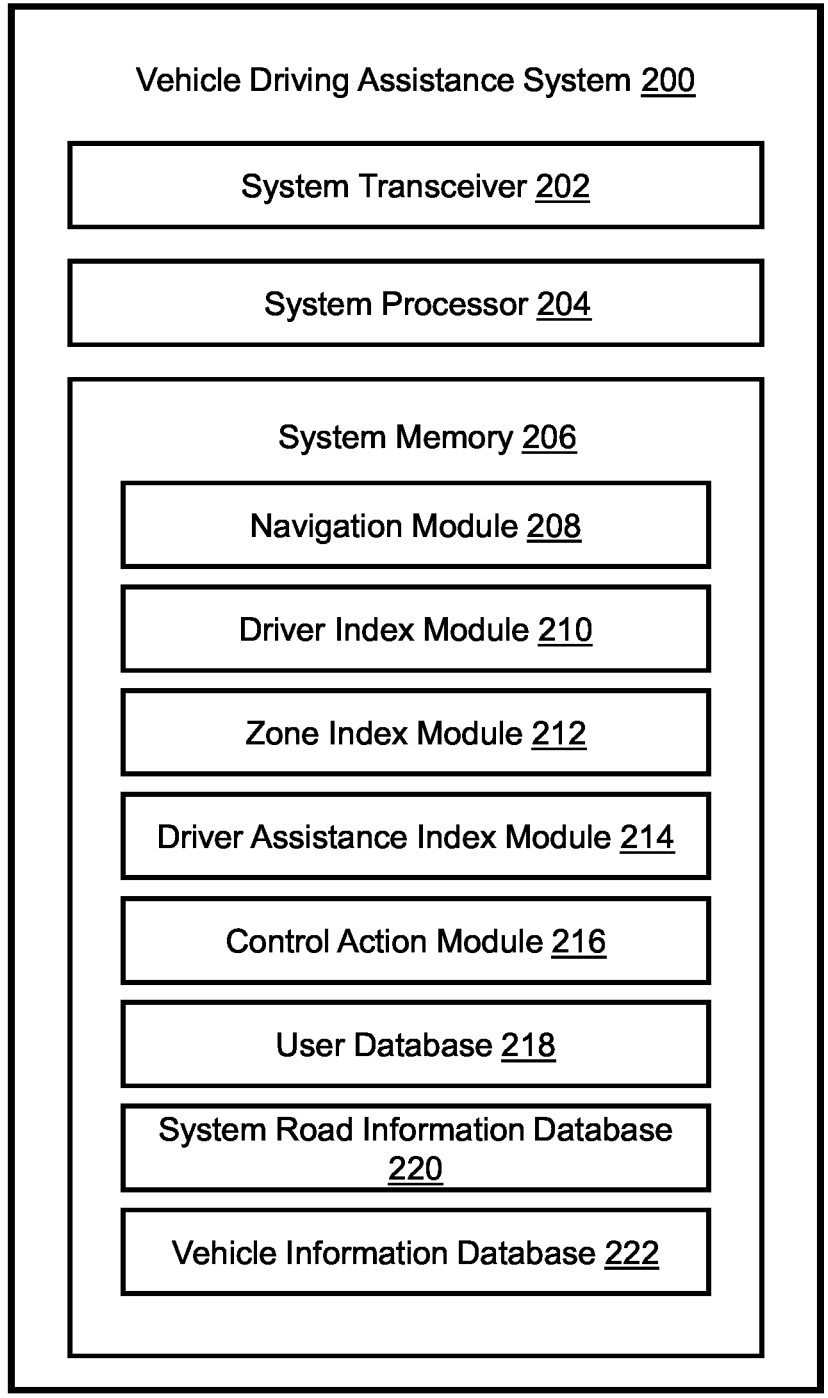
FIG. 2 depicts an example vehicle driving assistance system in accordance with the present disclosure.

FIG. 2 depicts an example vehicle driving assistance system 200 in accordance with the present disclosure. While explaining FIG. 2, references may be made to FIGS. 3, 4, 5A and 5B.

The system 200 may be same as the driving assistance system 110. In some aspects, the system 200 may be located inside the vehicle 102 and communicatively connected to the server 104 and the road information database 106 via the network 108. In other aspects, the system 200 may be located inside the server 104 and communicatively connected to the vehicle 102 and the road information database 106 via the network 108.

The system 200 may include a system transceiver 202, one or more system processors 204 (or a system processor 204) and a system memory 206. The system transceiver 202 may be configured to transmit and receive information to and from the vehicle 102, the server 104 and the road information database 106 via the network 108.

The system processor 204 may be disposed in communication with one or more memory devices, e.g., the system memory 206 and/or one or more external databases (not shown in FIG. 2). The system processor 204 may utilize the system memory 206 to store programs in code and/or to store data for performing system operations in accordance with the disclosure. The system memory 206 may be a non-transitory computer-readable memory storing a vehicle driving assistance program code. The system memory 206 can include any one or a combination of volatile memory elements (e.g., dynamic random-access memory (DRAM), synchronous dynamic random-access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

In some aspects, the system memory 206 may include a plurality of modules and databases including, but not limited to, a navigation module 208, a driver index module 210, a zone index module 212, a driver assistance index module 214, a control action module 216, a user database 218, a system road information database 220 and a vehicle information database 222. The modules, as described herein, may be stored in the form of computer-executable instructions, and the system processor 204 may be configured and/or programmed to execute the stored computer-executable instructions for performing vehicle driving assistance system functions in accordance with the present disclosure.

In operation, the system 200 may be configured to provide driving assistance to a vehicle operator ("user" or "vehicle user") when the user drives the vehicle 102. Specifically, in an exemplary aspect, the user may input a source location and a destination location associated with a user trip on a vehicle Human-Machine Interface (HMI), a vehicle navigation system interface or a user device (e.g., a mobile phone, a tablet, laptop, etc.) coupled to the vehicle 102. Responsive to receiving the source location and the destination location, the vehicle 102 (e.g., vehicle's navigation system) or the user device may transmit the source location and the destination location to a navigation server (which may be the server 104, or a separate dedicated navigation server), and the navigation server may recommend a first route for the user trip to the user. Responsive to receiving the recommended first route, the user may commence the trip along the recommended first route (or any other route different from the recommended first route, based on user's preference).

In some aspects, the vehicle 102 (e.g., the vehicle's navigation system) may additionally transmit, via the vehicle transceiver 120, the source location and the destination location to the system transceiver 202. In other aspects, the user device may transmit the source location and the destination location to the system transceiver 202. The system transceiver 202 may receive the source and destination locations and transmit the locations to the user database 218 for storage purpose. In addition, the system transceiver 202 may send the received source and destination locations to the system processor 204. In alternative aspects, the system processor 204 may fetch/obtain the source and destination locations from the user database 218.

Responsive to obtaining the source and destination locations associated with the user trip, the system processor 204 may send a request, via the system transceiver 202, to the road information database 106 to obtain road information for a geographical area including the source and destination locations. Responsive to receiving the request from the system processor 204, the road information database 106 may send the road information to the system transceiver 202, which may send the received road information to the system road information database 220 for storage purpose. In addition, the system transceiver 202 may send the road information to the system processor 204 for processing. Alternatively, the system processor 204 may fetch the road information from the system road information database 220.

In some aspects, the road information may include road geometry of the geographical area including the source and destination locations. Specifically, the geographical area may be divided/segregated into a plurality of geographical zones that form the geographical area road geometry. In some aspects, each geographical zone may be of same shape and dimensions. For example, each geographical zone may be square shaped with dimensions in a range of 0.5 to 1 mile. Alternatively, each geographical zone may be rectangular shaped.

Figure 3:
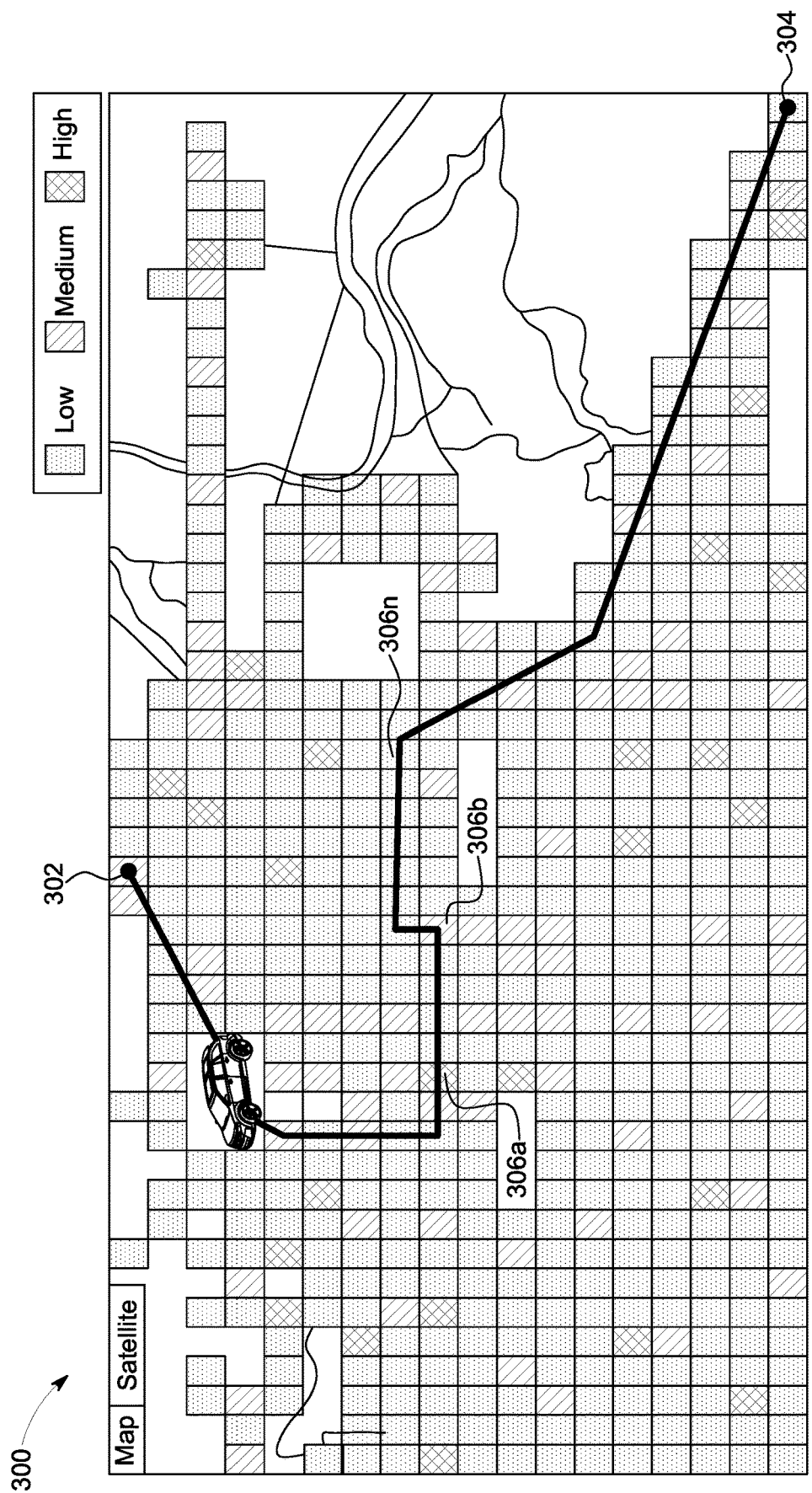
FIG. 3 depicts an example snapshot of a plurality of geographical zones of a geographical area in accordance with the present disclosure.

An example illustration of geographical zones is depicted in FIG. 3. Specifically, FIG. 3 depicts an example snapshot of a plurality of geographical zones of a geographical area 300, in accordance with the present disclosure. In some aspects, the geographical area 300 may include a source location 302 and a destination location 304 associated with the user trip that may be input by the user on the vehicle HMI, the vehicle navigation system or the user device (as described above). As shown in FIG. 3, the geographical area 300 may be divided into geographical zones 306*a*, 306*b*, 306*n* (collectively referred to as geographical zones 306) that may be rectangular shaped. In some aspects, the geometry of the geographical zones 306 may be stored in the road information database 106, and the system processor 204 may fetch the geographical zones 306 (or the geographical zone geometry) when the user inputs the source location 302 and the destination location 304 associated with the user trip.

In some aspects, the road information (that the road information database 106 may provide to the system processor 204) may further include a count of historical adverse instances for each geographical zone 306 that may have occurred over a first predefined time period. For example, the road information database 106 may provide a count of historical adverse instances that may have occurred over a period of one month, a quarter, six months, or a year. As described above, the historical adverse instances may be vehicle accidents that may have occurred in each geographical zone 306. In addition, the road information may include an average count of vehicles driven through each geographical zone 306 over a second predefined time period, for example, one day, one week and the like.

A person ordinarily skilled in the art may appreciate that since the road information includes an average count of vehicles driven through each geographical zone 306 over a time period, the road information that the system processor 204 receives from the road information database 106 is dynamic. Stated another way, the road information database 106 updates the road information based on variations in the average count of vehicles that may be driven through a geographical zone 306 over time. Similarly, the road information database 106 may update the road information based on variations in the count of adverse instances for each geographical zone 306 over time.

Responsive to obtaining the road information from the road information database 106, the system processor 204 may execute the instructions stored in the zone index module 212 and calculate a zone index for each geographical zone 306. In some aspects, the system processor 204 may calculate the zone index by calculating a ratio of the count of historical adverse instances that may have occurred over the first predefined time period and the average count of vehicles driven through each geographical zone 306 over the second predefined time period. In further aspects, the system processor 204 may calculate the zone index by calculating a logarithm (Log) of the ratio and mapping the log of the ratio with a predefined scale of zone indexes. As an example, if the count of historical adverse instances in a zone is 20 over a period of one year and the average count of driven vehicles in a day is 9628, the system processor 204 may calculate the log of the ratio as Log(20/(9628*365))=minus 5.2.

Responsive to calculating the log of the ratio, the system processor 204 may determine the zone index for each geographical zone 306 by mapping the calculated log of the ratio to the predefined scale of zone indexes, which may range from 0 to 10. For example, a log ratio of minus 7 may have a mapped zone index of 1, and a log ratio of minus 5 may have a mapped zone index of 8. In some aspects, the mapping of the log of the ratios with zone indexes may be pre-stored in the system memory 206, and the system processor 204 may fetch the mapping from the system memory 206 and determine the zone index for each geographical zone 306 based on the calculated log of the ratio.

In additional aspects, the system processor 204 may calculate the zone index for each geographical zone 306 based on a time of the day. For example, the system processor 204 may obtain, from the road information database 106, the count of historical adverse instances and the average count of driven vehicles for each geographical zone 306 for different time intervals. In an exemplary aspect, the system processor 204 may obtain the count of historical adverse instances and the average count of driven vehicles for time intervals of 7 AM-10 AM, 10 AM-1 PM, 1 PM-4 PM, 4 PM-7 PM and the like. Responsive to receiving the counts for different time intervals, the system processor 204 may calculate zone indexes for each geographical zone 306 during different time intervals, in the manner described above. In this case, each geographical zone 306 may have different zone indexes for different time intervals.

In some aspects, a zone index for a geographical zone may indicate a likelihood of a vehicle adverse instance occurring in the particular zone. For example, a zone with a higher zone index (e.g., greater than 6 or 7) may indicate that the likelihood of a vehicle adverse instance is high in the zone. Similarly, a zone with a low zone index (e.g., less than 2) may indicate that the likelihood of a vehicle adverse instance is low in the zone. A comparison of zones with different zone indexes is shown in shown in FIG. 3. Specifically, as an example illustration, zones with different zone indexes are shown with different shades in FIG. 3. As an example, the zone 306*a* may have a high zone index, the zone 306*n* may have a low zone index and the zone 306*b* may have a zone index that may be between the zone indexes associated with the zones 306*a* and 306*n*.

Figure 4:
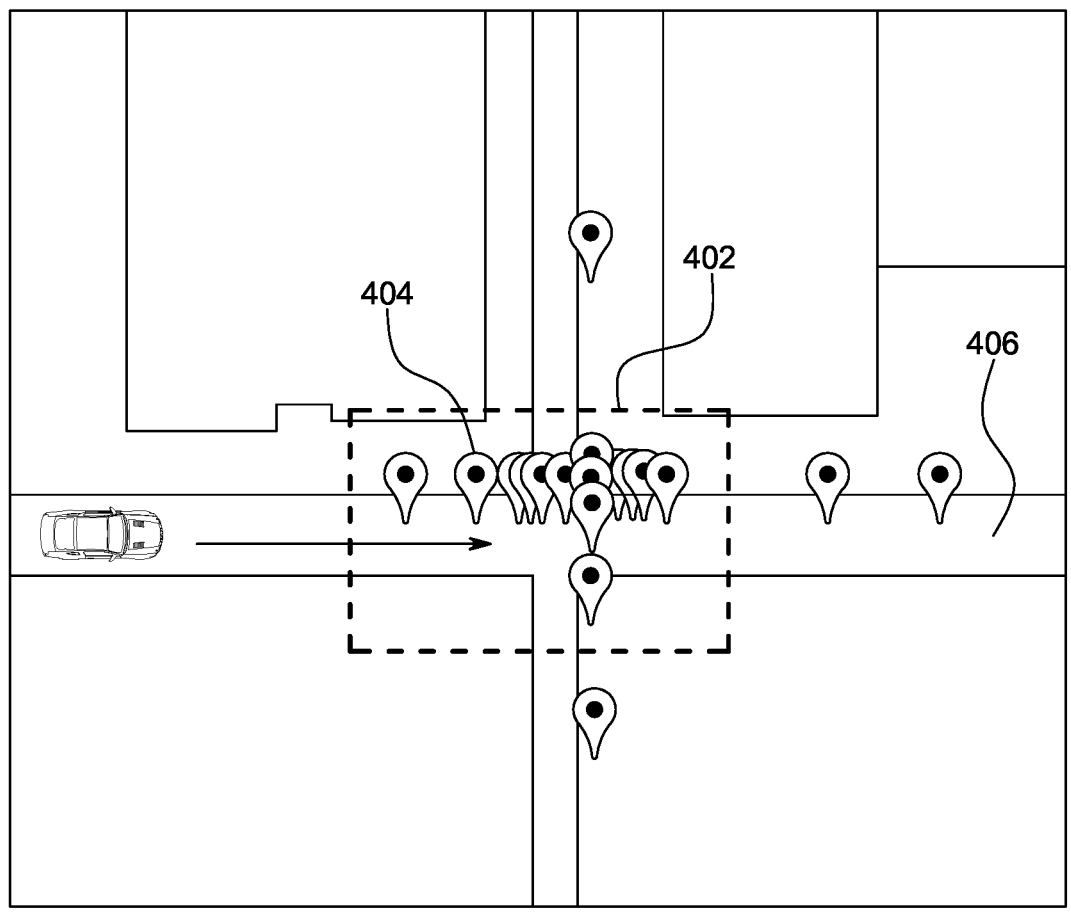
FIG. 4 depicts an example snapshot of a geographical zone representing a plurality of historical adverse instances in accordance with the present disclosure.

A close-up view of a zone is depicted in FIG. 4. Specifically, FIG. 4 depicts an example snapshot of a geographical zone 402 representing a plurality of historical adverse instances 404, in accordance with the present disclosure. In some aspects, the geographical zone 402 may be associated with a road crossing or a road intersection area of a road segment 406. The road segment 406 may be divided into a plurality of geographical zones (not shown in FIG. 4). As depicted in FIG. 4, a count of historical adverse instances in the geographical zone 402 may be higher than a count of historical adverse instances in other geographical zones associated with the road segment 406. Consequently, the geographical zone 402 zone index may be higher than the zone indexes associated with the other zones in the road segment 406 (assuming that the average count of driven vehicles is same or equivalent).

Responsive to calculating the zone indexes of each geographical zone 306, the system processor 204 may send the calculated zone indexes to the system road information database 220 for storage purpose. In some aspects, the system road information database 220 may store the zone indexes for each geographical zone 306 corresponding to different times of the day, as described above.

In further aspects, the system processor 204 may send a request, via the system transceiver 202, to the vehicle transceiver 120 to obtain vehicle user's driving information. Specifically, the system processor 204 may send the request to obtain the vehicle GNSS position and the vehicle telemetry information (e.g., the vehicle speed and heading) for the vehicle 102 that the vehicle user may be driving. Responsive to receiving the request from the system processor 204, the vehicle transceiver 120 may obtain the vehicle GNSS position from the navigation receiver 118 and the vehicle telemetry information from the VCU 112 (or the plurality of ECUs). The vehicle transceiver 120 may then transmit the vehicle GNSS position and the vehicle telemetry information to the system transceiver 202. Responsive to receiving the vehicle GNSS position and the vehicle telemetry information, the system transceiver 202 may send the received position and telemetry information to the vehicle information database 222 for storage purpose and to the system processor 204 for processing. In alternative aspects, the system processor 204 may fetch/obtain the vehicle GNSS position and the vehicle telemetry information from the vehicle information database 222.

In some aspects, the system processor 204 may obtain the vehicle GNSS position and the vehicle telemetry information at a predefined frequency. For example, the system processor 204 may obtain the vehicle GNSS position and the vehicle telemetry information every 25 milliseconds (ms), 50 ms or 100 ms.

Figure 5A:
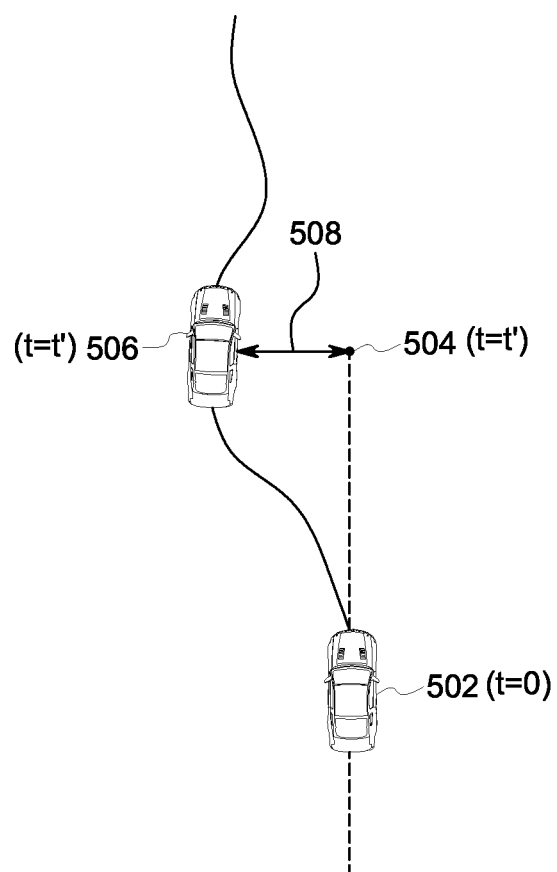
FIG. 5A depicts an example snapshot illustrating a current position and an estimated position of a vehicle in accordance with the present disclosure

Responsive to obtaining the vehicle GNSS position, the system processor 204 may determine a vehicle 102 current position. As an example, the system processor 204 may determine vehicle's GNSS position at time, t=0 (e.g., vehicle's current position), by obtaining the vehicle GNSS position at t=0. Further, the system processor 204 may execute the instructions stored in the driver index module 210 and determine an estimated vehicle position after a predefined time interval, e.g., at time, t=t' seconds, based on the obtained vehicle telemetry information. Specifically, the system processor 204 may use the vehicle speed and heading information included in the vehicle telemetry information, and determine the estimated vehicle position at t=t', based on the vehicle's GNSS position at t=0. An example illustration of vehicle's current position at t=0 and vehicle estimated position at t=t' is shown in FIG. 5A. Specifically, FIG. 5A depicts an example snapshot illustrating a vehicle's current position 502 (at t=0) and a vehicle's estimated position 504 (at t=t'), in accordance with the present disclosure.

Responsive to determining the vehicle's estimated position 504, the system processor 204 may determine vehicle's actual position 506 at t=t', by obtaining vehicle's GNSS position from navigation receiver 118 at t=t'. Specifically, the system processor 204 may send a request, via the system transceiver 202, to the navigation receiver 118 at t=t' to obtain the vehicle's actual position 506. Responsive to receiving the request from the system processor 204, the navigation receiver 118 may send the vehicle's GNSS position (i.e., the vehicle's actual position 506) to the system processor 204.

Responsive to determining the vehicle's actual position 506, the system processor 204 may execute the instructions stored in the driver index module 210 and calculate a displacement offset or a tracking error 508 for the vehicle 102. Hereinafter, the tracking error 508 is referred to as the displacement offset 508. In some aspects, the displacement offset 508 may be a difference between the vehicle's actual position 506 and the vehicle's estimated position 504, at t=t'. A person ordinarily skilled in the art may appreciate that the displacement offset 508 may be created as a result of vehicle speed variation (e.g., when the vehicle user frequently uses vehicle gas or brake pedals) or vehicle's directional displacement (e.g., when the vehicle user moves vehicle steering wheel in right or left direction). For example, as shown in FIG. 5A, the displacement offset 508 may be created when the vehicle user starts to swerve the vehicle 102.

In some aspects, the system processor 204 may calculate displacement offsets at a predefined frequency, e.g., every 50 ms or 100 ms, as the vehicle user drives the vehicle 102 from the source location 302 to the destination location 304. For example, the system processor 204 may determine vehicle's estimated positions every 100 ms and compare the vehicle's estimated positions with vehicle's actual positions. Based on the comparison, the system processor 204 may calculate displacement offsets every 100 ms. An example of calculated displacement offsets is shown in FIG. 5B.

Figure 5B:
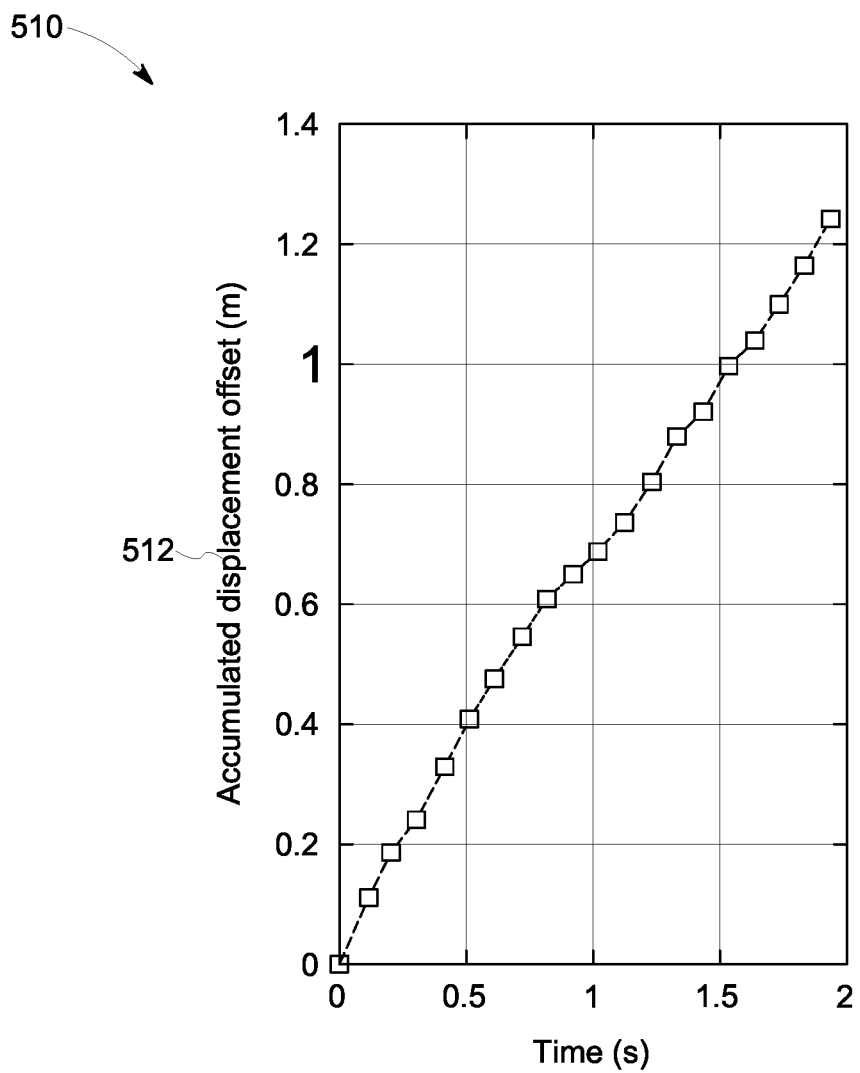
FIG. 5B depicts a graph illustrating an accumulated displacement offset in accordance with the present disclosure.

Specifically, FIG. 5B depicts a graph 510 illustrating an accumulated displacement offset 512 (in Y-axis), in accordance with the present disclosure. Specifically, the graph 510 depicts the accumulated displacement offset 512 (measured in meters) over a time interval (in X-axis) of 2 seconds. The system processor 204 may calculate displacement offsets every 100 ms and add displacement offsets over a time period of 2 seconds and calculate an accumulated or cumulative displacement offset 512, as shown in FIG. 5B. For example, in the graph 510, the accumulated displacement offset 512 is shown as approximately 1.3 meters over the time period of 2 seconds.

A person ordinarily skilled in the art may appreciate that the time interval of 2 seconds, as shown in FIG. 5B, is used as an example to illustrate the graph 510. The time interval of 2 seconds should not be construed as limiting the present disclosure scope. In alternative aspects, the accumulated displacement offset may be calculated over longer (or shorter) time periods, e.g., 5 seconds, 10 seconds, etc.

In some aspects, the accumulated displacement offset 512 over a predefined time interval (e.g., 2 seconds) may be associated with a user driving index of the vehicle user. The system processor 204 may calculate the accumulated displacement offset 512 regularly, at a predefined frequency (e.g., every 2 seconds or 5 seconds or 10 seconds), as the vehicle user drives the vehicle 102 from the source location 302 to the destination location 304. The system processor 204 may determine the user's driving index by mapping the accumulated displacement offset 512 to a predefined scale of user driving indexes, which may range from 0 to 10. For example, an accumulated displacement offset of 0.5 meters may have a mapped user driving index of 1, an accumulated displacement offset of 1.5 meters may have a mapped user driving index of 4, and an accumulated displacement offset of 4.5 meters may have a mapped user driving index of 7. In some aspects, the mapping of accumulated displacement offsets with user driving indexes may be pre-stored in the system memory 206, and the system processor 204 may fetch the mapping from the system memory 206 and determine the user drying index of the vehicle user based on the calculated accumulated displacement offset 512.

In additional aspects, the system processor 204 may update the user's driving index (that may be calculated regularly at the predefined frequency), by averaging the calculated past/historical accumulated displacement offsets. In some aspects, the system processor 204 may update the user's driving index by performing moving average analysis, posterior probability analysis (e.g., by using Bayes' theorem), etc., for the calculated past accumulated displacement offsets.

In some aspects, the user driving index may indicate a vehicle user's driving behavior. For example, a high user driving index may denote a high accumulated displacement offset 512, which in turn may indicate that the vehicle user has deviated substantially from the vehicle's estimated positions. In an exemplary aspect, an accumulated displacement offset of 0.5 m over a 2-second time interval may denote a low user driving index (e.g., a user driving index of 1), indicating acceptable driving behavior. Further, an accumulated displacement offset of 4 or 7 m may denote average or high user driving index (e.g., user driving indexes of 7 or more), respectively.

Responsive to calculating the accumulated displacement offset 512/user's driving index, the system processor 204 may send the user's driving index to the user database 218 for storage purpose.

Furthermore, responsive to calculating the zone indexes for each geographical zone 306 and the user's driving index as described above, the system processor 204 may execute instructions stored in the driver assistance index module 214 and calculate a driver assistance index for each geographical zone 306. Specifically, the system processor 204 may correlate or fuse the calculated zone indexes for each geographical zone 306 with the user's driving index and then calculate the driver assistance index for each geographical zone 306. For example, the system processor 204 may assign weights to the zone indexes and the user's driving index, when the system processor 204 performs the correlation. Further, the system processor 204 may calculate a weighted (or linear sum) of the zone index for each geographical zone 306 and the user's driving index, and calculate the driver assistance index for each geographical zone 306.

In some aspects, the system processor 204 may normalize the calculated driver assistance index on a scale of 0 to 10, when the system processor 204 calculates the weighted (or linear sum) of the zone index for each geographical zone 306 and the user's driving index.

In an exemplary aspect, a high zone index for a particular zone, summed with a high user's driving index, may result in a high driver assistance index for the particular zone. For example, a zone index of 8 summed with a user driving index of 7 may result in a high driver assistance index, which may be, for example, 7.5 (i.e., a linear average of the user driving index and the zone index). As another example, a zone index of 8 summed with a user driving index of 1 may result in a medium driving assistance index (e.g., 4.5, if the system processor 204 calculates a linear average of the zone index and the user driving index). The latter example illustrates that if the vehicle driver is driving the vehicle 102 cautiously (i.e., with less accumulated displacement offset), the driver assistance index may be medium, even if the vehicle user drives through a geographical zone with a high zone index. Similarly, a zone index of 5 summed with a user driving index of 1 may result in a low driving assistance index (e.g., 3, if the system processor 204 calculates a linear average of the zone index and the user driving index).

A person ordinarily skilled in the art may appreciate that although the example above mentions a linear average (and hence a linear sum) of the zone index and the user driving index, the system processor 204 may perform similar calculations for weighted sum of the zone index and the user driving index, and normalize the weighted sum on a scale of 0 to 10 to calculate the driving assistance index.

In some aspects, a high driver assistance index may indicate that the vehicle user may need a higher level of additional driving assistance in the particular zone. Similarly, a low zone index for a particular zone, summed with a low or an average user's driving index, may result in a low or an average driver assistance index for the particular zone. A low or an average driver assistance index may indicate that the vehicle user may need low or minimal additional driving assistance in the particular zone.

The system processor 204 may calculate the driver assistance index for each geographical zone 306 in the geographical area 300, in the manner described above. Responsive to calculating the driver assistance indexes for the geographical zones 306, the system processor 204 may send the calculated driver assistance indexes to the system road information database 220 for storage purpose.

A person ordinarily skilled in the art may appreciate that since the zone indexes of each geographical zone 306 may be different for different times of the day, the calculated driver assistance indexes for each geographical zone 306 may also be different for the different times. Therefore, the system road information database 220 may store different driver assistance indexes for each geographical zone 306 corresponding to different time intervals.

Responsive to calculating driver assistance index(es) for each geographical zone 306, the system processor 204 may execute instructions stored in the control action module 216 and perform one or more control actions, when the calculated driver assistance index for a particular geographical zone 306 exceeds a predefined threshold. For example, if the calculated driver assistance index for the geographical zone 306*a* is higher than the predefined threshold (e.g., at a specific time of the day), the system processor 204 may perform one or more control actions when the vehicle 102 passes through or approaches the geographical zone 306*a* (e.g., at the specific time).

In some aspects, the one or more control actions may include generation of an alert notification that may be transmitted to the vehicle HMI (or the user device coupled to the vehicle 102), which may inform the vehicle user that the vehicle user may be entering a zone with a high driver assistance index. For example, the system processor 204 may generate an alert notification and may transmit, via the system transceiver 202, the alert notification to the vehicle transceiver 120 (or the user device), when the vehicle 102 passes through or approaches the geographical zone 306*a*. Responsive to receiving the alert notification, the system transceiver 202 may send the alert notification to the vehicle HMI, which may output (visually or audibly) the alert notification. In some aspects, the alert notification may indicate to the vehicle user that the vehicle user should be cautious while driving the vehicle 102 through the geographical zone 306*a*. In an exemplary aspect, the system processor 204 may generate the alert notification when the vehicle 102 is a manually operated/driven vehicle or when the vehicle user is driving the vehicle 102.

In some aspects, the system processor 204 may adjust the alert notification based on the driver assistance index. For example, the system processor 204 may adjust audio intensity and/or notification content, based on whether the driver assistance index is low, average or high.

In further aspects, the one or more control actions may include automatic adjustment of vehicle settings/parameters, when the vehicle 102 is configured to operate in one or more partial autonomy modes (e.g., when the vehicle 102 is Level 1 to 4 AV). Specifically, the system processor 204 may automatically adjust one or more vehicle settings, e.g., via the DAT controller 116, when the vehicle 102 is a Level 1 to 4 AV and when the vehicle 102 passes through or approaches the geographical zone 306*a*. For example, the system processor 204 may transmit, via the system transceiver 202, instructions to the DAT controller 116 and automatically adjust vehicle distance gap setting (e.g., increase vehicle distance gap setting between the vehicle 102 and other vehicles/walkers) in adaptive cruise control, when the vehicle 102 passes through or approaches the geographical zone 306*a*. As another example, the system processor 204 may increase vehicle's displacement from pedestrian walkways, when the vehicle 102 passes through the geographical zone 306*a*.

The system processor 204 may cause the vehicle settings/parameters to change or revert to an original state, when the vehicle 102 enters a geographical zone with a driver assistance index lower than the geographical zone 306*a* driver assistance index. For example, the system processor 204 may lower the vehicle distance gap setting in adaptive cruise control and/or the vehicle's displacement from pedestrian walkways, when the vehicle 102 enters a geographical zone with a low driver assistance index.

In further aspects, the one or more control actions may include recommendation of an alternative route (e.g., a second route between the source location 302 and the destination location 304) for the user trip to the vehicle user. Specifically, the system processor 204 may execute instructions stored in the navigation module 208 and determine an alternative route for the user trip between the source location 302 and the destination location 304. In some aspects, the alternative route may include no or lesser number of geographical zones with high driver assistance indexes (e.g., higher than the predefined threshold) than the first route that the vehicle user may be following for the user trip.

In additional aspects, the system processor 204 may transmit, via the system transceiver 202, a request to the navigation server and fetch real-time traffic information from the navigation server. The system processor 204 may determine the alternative route for the user trip based on the real-time traffic information and the driver assistance indexes of each geographical zone 306. In this case, the alternative route may include those geographical zones that may have less traffic (e.g., less than a predefined traffic threshold) and have corresponding driver assistance indexes less than the predefined threshold.

Responsive to determining the alternative route, the system processor 204 may recommend the alternative route to the vehicle user. In some aspects, the system processor 204 may recommend the alternative route by displaying the alternative route on a geographical area 300 map (e.g., as shown in FIG. 3) on the vehicle HMI or the user device. Specifically, the system processor 204 may transmit, via the system transceiver 202, the geographical area 300 map (as shown in FIG. 3) to the vehicle HMI or the user device, which may enable the vehicle user to view the recommended alternative route. In some aspects, the transmitted geographical area 300 map may include the recommended alternative route augmented on the map. In additional aspects, the system processor 204 may provide navigation instructions for the recommended alternative route that may be displayed (or output as audible instructions) on the vehicle HMI.

In additional aspects, the system processor 204 may recommend alternative routes to a plurality of vehicles based on the driver assistance indexes for the geographical zones 306, in the manner described above, and may thus assist in management of a vehicle fleet.

Although the description above describes three control action examples for the vehicle 102 that the system processor 204 may perform (based on the calculated driver assistance indexes for each geographical zone 306), a person ordinarily skilled in the art may appreciate that the system processor 204 may perform additional vehicle control actions as well, without departing from the present disclosure scope. The examples described above should not be construed as limiting the present disclosure scope.

Figure 6:
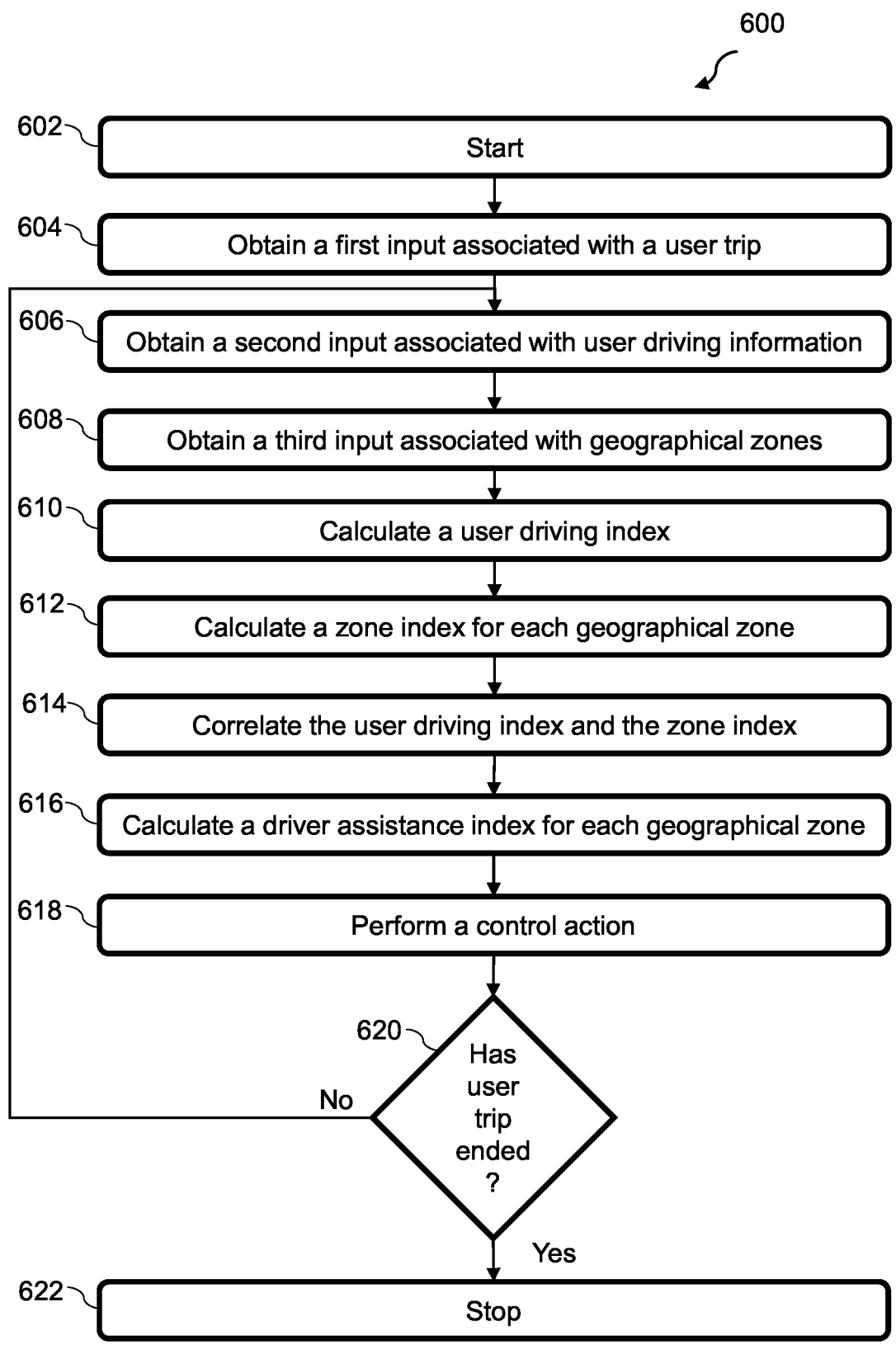
FIG. 6 depicts a flow diagram of an example vehicle driving assistance method in accordance with the present disclosure.

FIG. 6 depicts a flow diagram of an example vehicle driving assistance method 600, in accordance with the present disclosure. FIG. 6 may be described with continued reference to prior figures. The following process is exemplary and not confined to the steps described hereafter. Moreover, alternative embodiments may include more or less steps that are shown or described herein and may include these steps in a different order than the order described in the following example embodiments.

Referring to FIG. 6, at step 602, the method 600 may commence. At step 604, the method 600 may include obtaining, by the system processor 204, a first input associated with the source location and the destination location for the user trip. As described above, the system processor 204 may obtain the user's trip source and destination locations from the vehicle HMI, the vehicle navigation system or the user device. At step 606, the method 600 may include obtaining, by the system processor 204, a second input associated with the user driving information. As described above, the system processor 204 may obtain the user driving information, i.e., the vehicle GNSS position and the vehicle telemetry information, from the vehicle 102.

At step 608, the method 600 may include obtaining, by the system processor 204, a third input associated with the road information for the plurality of geographical zones 306 between the source location and the destination location. The system processor 204 may receive the road information from the road information database 106. Further, as described above, the road information may include, for each geographical zone, the count of historical adverse instances in the first predefined time interval and the average count of driven vehicles in the second predefined time interval.

Responsive to obtaining the first input, the second input and the third input, the system processor 204 may calculate the user driving index at step 610. As described above, the system processor 204 may calculate the user driving index based on the second input, specifically based on the obtained vehicle GNSS position and the vehicle telemetry information. The detailed process of calculating the user driving index is described above in conjunction with FIG. 2.

At step 612, the method 600 may include calculating, by the system processor 204, the zone index for each geographical zone 306 based on the third input (i.e., the road information for each geographical zone 306). As described above, the system processor 204 may calculate the zone index for the geographical zone 306 based on the ratio of the count of historical adverse instances (over the first predefined time interval) and the average count of driven vehicles (over the second predefined time interval) in the geographical zone 306. Specifically, the system processor 204 may calculate a log of the ratio and then map the log to a predefined scale of zone indexes, which may range from 0 to 10, to determine the zone index for the geographical zone 306. The process of determining the zone index is described above in conjunction with FIG. 2.

At step 614, the method 600 may include correlating, by the system processor 204, the calculated user driving index and the zone index. At step 616, the method 600 may include calculating, by the system processor 204, the driver assistance index for each geographical zone 306 based on the correlation. As described above, the system processor 204 may calculate a weighted or linear sum of the zone index for each geographical zone 306 and the user's driving index, and calculate the driver assistance index for each geographical zone 306. In some aspects, the system processor 204 may normalize the weighted or linear sum of the zone index for each geographical zone 306 and the user's driving index on a scale of 0 to 10, to calculate the driver assistance index, as described above.

At step 618, the method 600 may include performing, by the system processor 204, a control action when the driver assistance index is greater than the predetermined threshold. Examples of control actions are already described above in conjunction with FIG. 2.

At step 620, the method 600 may include determining, by the system processor 204, whether the user trip has ended. In some aspects, the system processor 204 may determine whether the user trip has ended by determining whether the vehicle is in motion. In particular, the system processor 204 may determine whether the vehicle is in motion based on the vehicle GNSS position and/or the vehicle telemetry information (e.g., the vehicle speed and heading) received from the vehicle 102 (specifically, the vehicle transceiver 120). For example, the system processor 204 may determine that the vehicle 102 may not be in motion when the vehicle 102 reaches the destination location, as determined from the vehicle GNSS position, and/or the vehicle speed is zero. In other aspects, the system processor 204 may determine that the vehicle 102 may be in motion when the vehicle speed is not zero.

Responsive to determining that the user trip has ended at the step 620, the method 600 may return to step 606. Stated another way, the system processor 204 may perform the steps 606, 608, 610, 612, 614, 616 and 618 iteratively, till the user trip ends.

Responsive to determining that the user trip has ended at the step 620, the method 600 may stop at step 622.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A vehicle driving assistance system comprising:
   a transceiver configured to:

receive a first input associated with a user driving information, and receive a second input associated with road information for a plurality of geographical zones, wherein the road information for each geographical zone comprises a count of historical adverse instances in a first predefined time interval and an average count of driven vehicles in a second predefined time interval;

a processor communicatively coupled to the transceiver; and a memory for storing executable instructions, the processor configured to execute the instructions to:

obtain the first input and the second input;

calculate a user driving index based on the first input;

calculate a zone index for each geographical zone based on the second input, wherein the zone index is calculated based on a ratio of the count of historical adverse instances and the average count of driven vehicles;

correlate the user driving index and the zone index;

calculate a driver assistance index for each geographical zone based on the correlation; and perform a control action when the driver assistance index is greater than a predetermined threshold.

2. The vehicle driving assistance system of claim 1 further comprising receiving a third input associated with a source location and a destination location for a user trip.

3. The vehicle driving assistance system of claim 2, wherein the plurality of geographical zones is between the source location and the destination location.

4. The vehicle driving assistance system of claim 2, wherein the transceiver is configured to:

receive the first input from a vehicle;

receive the second input from a road information database; and receive the third input from a user device or a vehicle navigation system.

5. The vehicle driving assistance system of claim 1, wherein the control action comprises automatic adjustment of at least one vehicle parameter.

6. The vehicle driving assistance system of claim 5, wherein the at least one vehicle parameter comprises a vehicle distance gap setting.

7. The vehicle driving assistance system of claim 1, wherein the control action comprises recommendation of a route having geographical zones with corresponding driver assistance indexes less than the predetermined threshold.

8. The vehicle driving assistance system of claim 7, wherein the processor is further configured to provide navigation instructions for the route.

9. The vehicle driving assistance system of claim 1, wherein the control action comprises generation of a user notification.

10. The vehicle driving assistance system of claim 9, wherein the transceiver is further configured to transmit the user notification to a user device or a vehicle infotainment system.

11. The vehicle driving assistance system of claim 1, wherein the processor is further configured to:

determine a current vehicle position based on the user driving information;

estimate a vehicle position at a third predefined time interval based on the user driving information and the current vehicle position;

obtain a vehicle actual position via a Global Navigation Satellite System (GNSS) at the third predefined time interval;

calculate a displacement offset between the vehicle actual position and the estimated vehicle position; and calculate the user driving index based on the displacement offset.

12. The vehicle driving assistance system of claim 1, wherein the correlation comprises determination of a weighted sum of the user driving index and the zone index.

13. A vehicle driving assistance method comprising:

obtaining, by a processor, a first input associated with a user driving information;

obtaining, by the processor, a second input associated with road information for a plurality of geographical zones, wherein the road information for each geographical zone comprises a count of historical adverse instances in a first predefined time interval and an average count of driven vehicles in a second predefined time interval;

calculating, by the processor, a user driving index based on the first input;

calculating, by the processor, a zone index for each geographical zone based on the second input, wherein the zone index is calculated based on a ratio of the count of historical adverse instances and the average count of driven vehicles;

correlating, by the processor, the user driving index and the zone index;

calculating, by the processor, a driver assistance index for each geographical zone based on the correlation; and performing, by the processor, a control action when the driver assistance index is greater than a predetermined threshold.

14. The vehicle driving assistance method of claim 13 further comprising obtaining, by the processor, a third input associated with a source location and a destination location for a user trip.

15. The vehicle driving assistance method of claim 14, wherein the plurality of geographical zones is between the source location and the destination location.

16. The vehicle driving assistance method of claim 13, wherein performing the control action comprises automatically adjusting at least one vehicle parameter.

17. The vehicle driving assistance method of claim 13, wherein performing the control action comprises recommending a route having geographical zones with corresponding driver assistance indexes less than the predetermined threshold.

18. The vehicle driving assistance method of claim 13, wherein performing the control action comprises generating a user notification.

19. The vehicle driving assistance method of claim 13 further comprising:

determining a current vehicle position based on the user driving information;

estimating a vehicle position at a third predefined time interval based on the user driving information and the current vehicle position;

obtaining a vehicle actual position via a Global Navigation Satellite System (GNSS) at the third predefined time interval;

calculating a displacement offset between the vehicle actual position and the estimated vehicle position; and calculating the user driving index based on the displacement offset.

20. A non-transitory computer-readable medium storing computer-executable instructions which when executed by one or more processors result in performing operations comprising:

obtaining a first input associated with a user driving information;

obtaining a second input associated with road information for a plurality of geographical zones, wherein the road information for each geographical zone comprises a count of historical adverse instances in a first predefined time interval and an average count of driven vehicles in a second predefined time interval;

calculating a user driving index based on the first input;

calculating a zone index for each geographical zone based on the second input, wherein the zone index is calculated based on a ratio of the count of historical adverse instances and the average count of driven vehicles;

correlating the user driving index and the zone index;

calculating a driver assistance index for each geographical zone based on the correlation; and performing a control action when the driver assistance index is greater than a predetermined threshold.

\* \* \* \* \*